May 22, 1951            C. G. ROWLAND            2,554,123
APPARATUS FOR CUTTING BRUSH STRIPS
Filed Feb. 19, 1947                       2 Sheets—Sheet 1
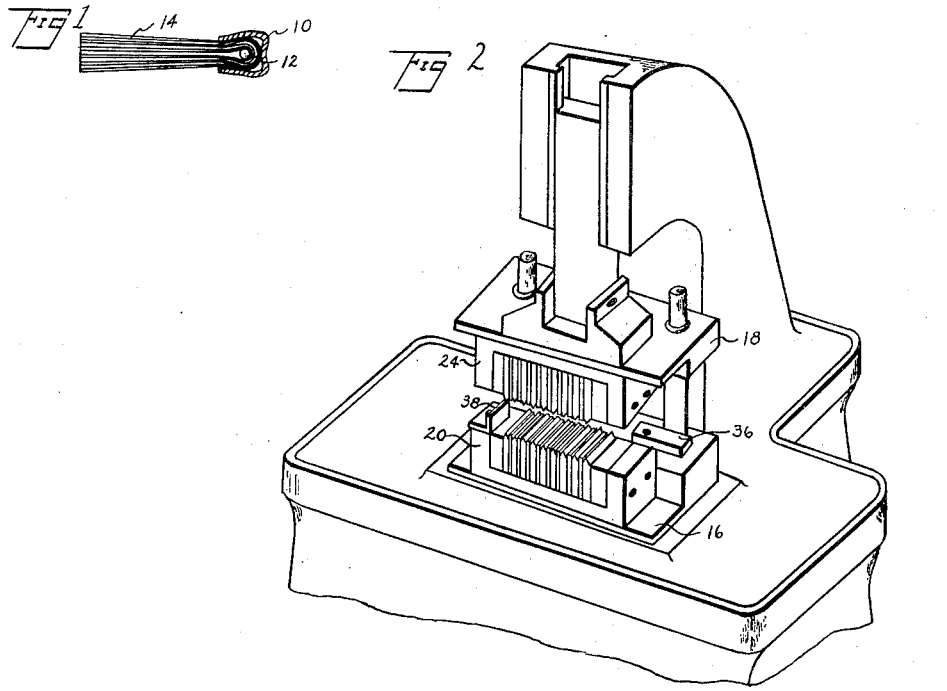
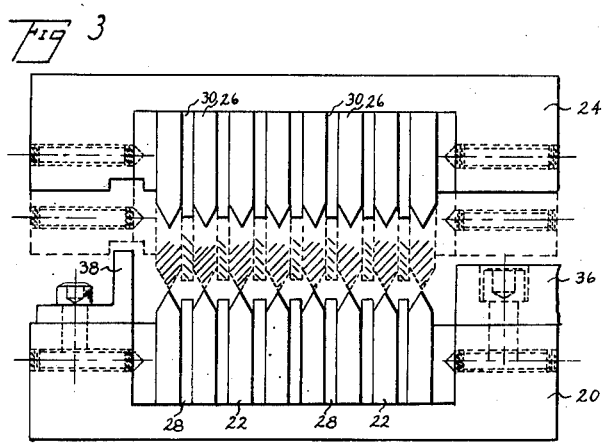
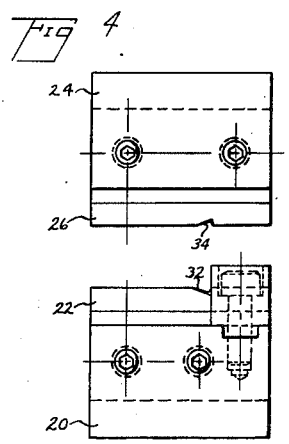
INVENTOR.
CLARENCE G. ROWLAND
BY S. Jay Teller
ATTORNEY May 22, 1951 C. G. ROWLAND 2,554,123
APPARATUS FOR CUTTING BRUSH STRIPS
Filed Feb. 19, 1947 2 Sheets-Sheet 2
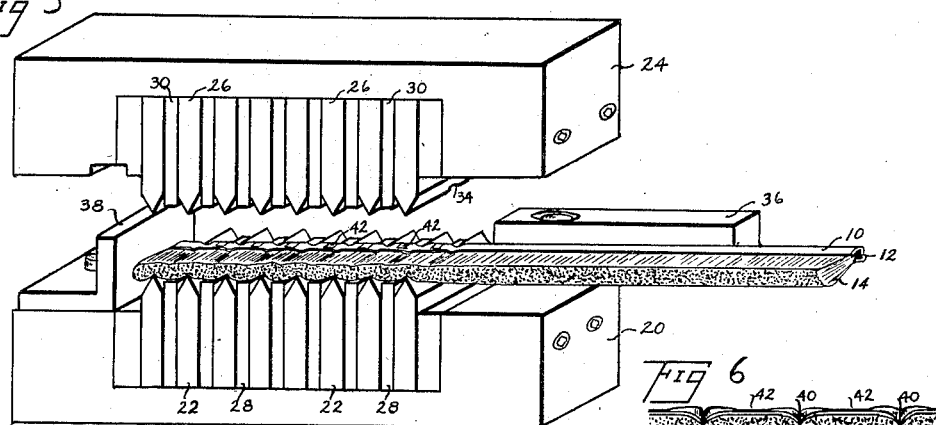
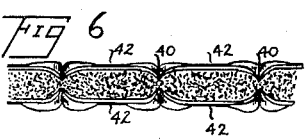
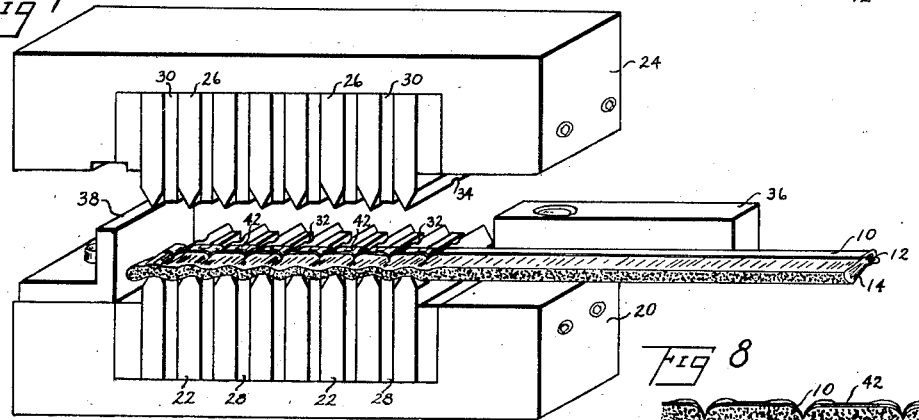
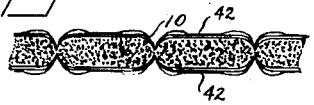
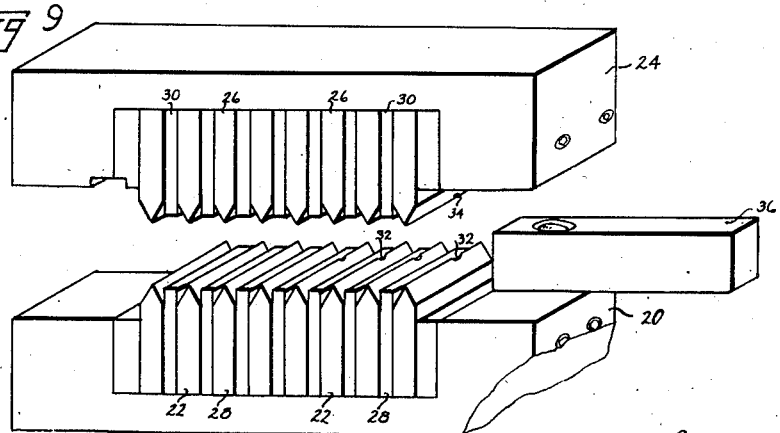
INVENTOR.
CLARENCE G. ROWLAND
BY
S. Jay Teller
ATTORNEY Patented May 22, 1951

2,554,123

UNITED STATES PATENT OFFICE 2,554,123

APPARATUS FOR CUTTING BRUSH STRIPS

Clarence G. Rowland, Newington, Conn., assignor to The Fuller Brush Company, Hartford, Conn., a corporation of Connecticut Application February 19, 1947, Serial No. 729,618

10 Claims. (Cl. 300—2)

The present invention relates to the cutting of brush strips, and more particularly brush strips of the type wherein each comprises a longitudinal holder generally U-shaped in cross section, a longitudinal core wire within the holder and bristles doubled around the wire and extending transversely from the mouth of the holder. Heretofore, such brush strips have been cut into suitable relatively long lengths by oppositely disposed cutting blades, either a single pair of blades being provided or a series of pairs of blades spaced apart to cut two or more lengths at the same time. It has also been the prior practice to subject the strips to a preliminary crimping action to provide crimps at the places to be cut.

The prior practice has been acceptable for the cutting of relatively long lengths of brush strip, but prior to the present invention it was not feasible to cut very short lengths, that is lengths as short as two or three times the thickness of the strip. When attempts were made to cut short lengths it was found that the cutting blades seriously distorted the U-shaped holder, that the core wire was forced endwise in one direction or the other, and that the bristles were moved to various positions at angles to their normal transverse positions. The resulting short lengths were so seriously distorted and mutilated as to be unsuitable for use.

In accordance with the present invention gripping jaws are provided which pinch the holder of the strip either during the preliminary crimping or during cutting or during both, the said gripping jaws serving to prevent distortion of the holder and to prevent movement of the core wire and of the bristles relatively to the holder. The invention relates to an apparatus including the said gripping jaws wherein the gripping jaws or their equivalents are used to hold the brush strip during crimping or during cutting or during both.

In the drawings I have shown in detail two alternative apparatuses embodying the invention, but it will be understood that various changes may be made from the constructions shown and that the drawings are not to be construed as defining or limiting the scope of the invention, the claims forming a part of this specification being relied upon for that purpose.

Of the drawings:

Fig. 1 is a cross-sectional view of a brush strip of the type adapted to be cut in accordance with the invention.

Fig. 2 is a perspective view of a press provided with an apparatus embodying the invention.

Fig. 3 is a front view of an apparatus embodying the invention.

Fig. 4 is an end view.

Fig. 5 is a perspective view showing the apparatus and showing a brush strip after the preliminary crimping operation.

Fig. 6 is a longitudinal sectional view of a brush strip after the preliminary crimping operation, the section being taken immediately adjacent the front of the holder of the strip.

Fig. 7 is a view similar to Fig. 5 but showing the brush strip after the final cutting operation.

Fig. 8 is a view similar to Fig. 6 but showing the brush strip after the final cutting operation.

Fig. 9 is a view similar to Fig. 5 but showing an alternative apparatus with the brush omitted.

Fig. 10 is a view similar to Fig. 6 but showing the brush strip as it appears after operation thereon by the apparatus shown in Fig. 9.

Fig. 1 of the drawings shows a brush strip of the type particularly adapted to be cut in accordance with the present invention. This strip comprises a longitudinal metallic holder 10 which is generally U-shaped in cross section. Positioned within the holder 10 is a core wire 12 and also bristles 14, the latter being arranged in a longitudinal series and being looped or doubled around the core wire 12 so as to extend transversely from the mouth of the holder 10. It will be understood that after the wire and the bristles were inserted in the holder, the sides of the holder were pressed together to firmly hold the core wire and the bristles in place.

Fig. 2 shows a press in which an apparatus embodying the invention may be used. The showing in Fig. 2 is intended to be conventional and a press of any suitable form may be provided. The press has a base plate 16 adapted to support the lower unit of the apparatus and to hold it in stationary position. The press also has a plate 18 adapted to support the upper unit of the apparatus, this plate being vertically movable by means of a foot treadle or a suitable power driven mechanism.

The apparatus as shown more clearly in Figs. 3 and 4 comprises lower and upper units adapted to be secured respectively to the plates 16 and 18 of the press. The lower unit includes a retaining block 20 in which a set of transversely extending cutting blades 22, 22 is mounted. These blades are spaced apart by distances equal to the strip lengths to be cut. The upper unit of the apparatus includes a retaining block 24 in which a set of transversely extending cutting blades 26, 26 is mounted. These blades are spaced apart by distances equal to the strip lengths to be cut. The several cutting blades 22, 22 and 26, 26 have oppositely inclined faces which form cutting edges. It will be understood that the two units are so mounted in the press that the cutting edges of the blades 26, 26 of the upper set are in vertical register with the cutting edges of the blades 22, 22 of the lower set, so that they cut a strip located between the two sets of blades when the upper blades are moved downward into engagement or substantial engagement with the blades of the lower set.

Spacing plates 28, 28 are provided between at least some of the blades 22, 22 of the lower set and these plates extend upward to such an extent as to be adapted to engage the strip to be cut. Spacing plates 30, 30 are provided between at least some of the blades 26, 26 of the upper set, and these plates extend downward to such an extent as to be adapted to engage the strip to be cut. The lower and upper plates 28, 28 and 30, 30 constitute two sets of gripping jaws which engage and hold the strip as will be more fully explained. The jaws of each set project toward a transverse plane through the cutting edges of the corresponding blades and they project beyond the adjacent inclined faces of the blades.

Preferably, as shown more clearly in Fig. 4, some of the blades, and desirably all of the blades 22, 22 and 26, 26 of the two sets are provided respectively with notches 32, 32 and 34, 34, or are otherwise formed to indent the strip rather than cut it. The notched blades of the two sets are arranged in pairs so that the respective notches 32 and 34 of each pair are in vertical register with each other. The notches 32 and 34 are so shaped that when the upper blades are moved downward toward the lower blades, the said notches serve to crimp the strip at the places where cutting is to be subsequently effected.

Preferably a guide block 36 is provided at one end of the lower unit, as for instance at the right end, and a stop 38 is provided on the lower unit adjacent the other end, as for instance the left end.

Fig. 5 shows a brush strip which has been fed into the apparatus from the right, this strip having been guided by the guide block 36 and movement thereof having been limited by the stop 38. All of the blades 22, 22 and 26, 26 are provided with notches 32, 32 and 34, 34. The effect of a downward stroke of the upper unit is to crimp the strip at both sides as indicated at 40, 40, the crimping being effected at the places where the strip is later to be cut. While the strip is being crimped the gripping jaws 28, 28 and 30, 30 are brought into engagement with it, these jaws serving to pinch the U-shaped holder of each length of the strip. The jaws form indentations 42, 42 in the strip at both sides thereof, and the indentations 42, 42 formed by the gripping jaws cooperate with the crimps 40, 40 formed by the blades to firmly hold the wire 12 and the bristles 14 to prevent distortion of the strip when final cutting takes place.

After the strip has been indented, as shown in Figs. 5 and 6, it is moved transversely so as to be out of register with the notches 32, 32 and 34, 34. The top unit of the apparatus is again moved downward, and during such movement the cutting portions of the blades 22, 22 and 26, 26 engage the strip at the previously formed crimps 40, 40 and cut it into the required lengths. During the cutting operation the gripping jaws 28, 28 and 30, 30 again engage the strip between the adjacent pairs of cutting blades at the previously formed indentations 42, 42, and the said gripping jaws again pinch the U-shaped holder so as to prevent any distortion of the several parts of the short strip lengths or any relative movement of the said parts with respect to the others.

Fig. 8 shows the strip after the completing of the final cutting operation. It will be seen that the short strip lengths are not distorted and that the end portions of the holder 10 have been folded inward to completely enclose the ends. As indicated in this figure, the movement of the upper unit may be so controlled as to avoid complete severance of the short strip lengths. For some purposes it is preferable to leave the several lengths adhering to each other, the cutting being sufficient however to permit the said short lengths to be readily broken apart as later required.

I have shown and described the gripping jaws 28, 28 and 30, 30 as extending throughout substantially the entire lengths of the blades, the jaws thus being positioned between the crimping portions of the blades and between the cutting portions of the blades. However, the invention is not necessarily narrowly limited as to the length of the gripping of jaws.

Fig. 9 shows an alternative embodiment of the invention wherein only some of the blades are provided with crimping notches 32, 32 and 34, 34. The pairs of blades at one end are provided with such notches and the pairs at the other end are not so provided. As shown, there are eight blades and the first four blades at the right are notched and the other four blades at the left are not notched.

When the apparatus is constructed as shown in Fig. 9 the strip is initially fed in only sufficiently to be engaged by the notched blades on the first stroke. During the said first stroke four pairs of crimps 40, 40 are formed. The strip is then fed toward the left to bring the crimps into register with the four unnotched blades and on the next stroke final cutting is effected by the four cutting blades at the left and notching is effected by the four crimping blades at the right. The strip is fed successively toward the left and on successive strokes four short lengths of strip are finally cut and crimping is effected preparatory to the subsequent cutting of four additional short lengths. The action of the gripping jaws is the same as already described.

What I claim is:

1. In an apparatus for cutting into short lengths a brush strip comprising a longitudinal holder generally U-shaped in cross section, a longitudinal core wire within the holder and a longitudinal series of bristles doubled around the core wire and extending transversely from the mouth of the holder, the said apparatus comprising in combination two sets of transversely extending oppositely disposed cutting blades, the blades of each set being spaced apart by distances equal to the lengths to be cut and the blades of the two sets registering with each other, supports for the respective sets of blades one of which supports is movable toward and away from the other to cause the blades to cut, and oppositely disposed gripping jaws located between each two adjacent blades of each set and in fixed relation thereto, the said jaws having projecting portions so related to the blades that they pinch and indent the U-shaped holder of each length of strip and hold the several strip portions to prevent distortion thereof during action thereon by the blades.

2. In an apparatus for cutting into short lengths a brush strip comprising a longitudinal holder generally U-shaped in cross section, a longitudinal core wire within the holder and a longitudinal series of bristles doubled around the core wire and extending transversely from the mouth of the holder, the said apparatus comprising in combination two sets of transversely extending oppositely disposed blades with the blades of each set spaced apart by distances equal to the lengths to be cut and with the blades of the two sets in register with each other, at least some of the registering pairs of blades of the two sets having registering crimping notches and at least some of the registering pairs of blades of the two sets having cutting edges, supports for the respective sets of blades one of which supports is movable toward and away from the other to cause the blades to crimp or cut, and oppositely disposed gripping jaws having projecting portions located between some of the blades of each set and in fixed relation thereto, the said jaws being so related to the blades that they pinch the U-shaped holder of each length of strip and hold the several strip portions to prevent distortion during action thereon by the blades.

3. An apparatus as set forth in claim 2, wherein there are gripping jaws between the notched portions of adjacent blades.

4. An apparatus as set forth in claim 2, wherein there are gripping jaws between the cutting portions of adjacent blades.

5. An apparatus as set forth in claim 2, wherein there are gripping jaws between the notched portions of adjacent blades and are also between the cutting portions of adjacent blades.

6. In an apparatus for cutting into short lengths a brush strip comprising a longitudinal holder generally U-shaped in cross section, a longitudinal core wire within the holder and a longitudinal series of bristles doubled around the core wire and extending transversely from the mouth of the holder, the said apparatus comprising in combination two sets of transversely extending oppositely disposed cutting blades with the blades of each set spaced apart by distances equal to the lengths to be cut and with the blades of the two sets in register with each other, each of the registering pairs of blades of the two sets having registering crimping notches, supports for the respective sets of blades one of which supports is movable toward and away from the other to cause the blades to crimp or cut, and oppositely disposed gripping jaws having projecting portions located between some of the blades of each set and in fixed relation thereto, the said jaws being so related to the blades that they pinch and hold the U-shaped holder of each length of strip during crimping or cutting thereof by the blades.

7. In an apparatus for cutting into short lengths a brush strip comprising a longitudinal holder generally U-shaped in cross section, a longitudinal core wire within the holder and a longitudinal series of bristles doubled around the core wire and extending transversely from the mouth of the holder, the said apparatus comprising in combination two sets of transversely extending oppositely disposed cutting blades with the blades of each set spaced apart by distances equal to the lengths to be cut and with the blades of the two sets in register with each other, the registering pairs of blades at one end of the sets having registering crimping notches and the remaining registering pairs of blades at the other end of the sets having cutting edges in longitudinal alignment with the notches, supports for the respective sets of blades one of which supports is movable toward and away from the other to cause the notched blades to crimp the strip and to cause the remaining blades to cut the strip, and oppositely disposed gripping jaws having projecting portions located between some of the cutting blades of each set and in fixed relation thereto, the said jaws being so related to the blades that they pinch the U-shaped holder of each strip and hold the several strip portions to prevent distortion during action thereon by the blades.

8. An apparatus as set forth in claim 7, wherein there are gripping jaws between the crimping blades.

9. An apparatus as set forth in claim 7, wherein there are gripping jaws between the cutting blades.

10. An apparatus as set forth in claim 7, wherein there are gripping jaws between the crimping blades and also between the cutting blades.

CLARENCE G. ROWLAND.

REFERENCES CITED

The following references are of record in the file of this patent:

UNITED STATES PATENTS

| Number | Name | Date |
|---|---|---|
| 486,917 | Walker | Nov. 17, 1892 |
| 519,264 | Little | May 1, 1894 |
| 1,288,663 | Ormes | Dec. 24, 1918 |
| 2,035,709 | Laub | Mar. 3, 1936 |
| 2,363,685 | Neuschaefer | Nov. 28, 1944 |